Patented Apr. 22, 1941

2,238,938

UNITED STATES PATENT OFFICE 2,238,938

PROCESS FOR THE PREPARATION OF NAPHTHAZARIN INTERMEDIATE

David X. Klein, Silverside Heights, Del., assignor to E. I. du Pont de Nemours & Company, Wilmington, Del., a corporation of Delaware No Drawing. Application May 23, 1939, Serial No. 275,155

3 Claims. (Cl. 260—396)

This invention relates to an improved process for the preparation of naphthazarin intermediate. The invention relates more particularly to a new and improved process for isolating the naphthazarin intermediate by precipitating it as the alkali metal salts from the solution in which it is formed, and in separating it from impurities.

In copending application, Serial No. 275,156 by M. S. Whelen, a process has been disclosed for isolating the naphthazarin intermediate in a simple and economical manner in the form of its alkali metal salts. In the formation of the naphthazarin intermediate from 1,5-dinitronaphthalene certain by-products are formed, some of which are precipitated out of the acid solution together with the naphthazarin intermediate when the mass is neutralized with alkali. According to the process of the application above mentioned, the naphthazarin intermediate may be separated from the mixture in pure form by means of glacial acetic acid.

It is an object of this invention to provide a simple and economical method for purifying naphthazarin intermediate which has been separated from the acid solution in which it is prepared in the form of its alkali metal salt.

According to the present process 1,5-dinitronaphthalene is converted to naphthazarin intermediate in sulfuric acid by the use of sulfur sesquioxide. When the reaction is completed the aqueous acid solution, which results by drowning the naphthazarin intermediate reaction mass in ice and water, is filtered and the crude naphthazarin intermediate product is isolated as described in copending application, Serial No. 275,156, by treatment of the cooled solution with an alkali metal compound such as sodium hydroxide, carbonate or corresponding potassium compounds which precipitate out the naphthazarin intermediate and some impurities in the form of alkali metal salts. The solution so long as it is acid must be kept sufficiently cool to prevent conversion of the naphthazarin intermediate to naphthazarin which takes place when dilute acid solutions of the naphthazarin intermediate become too warm. I have found that this crude naphthazarin intermediate may be conveniently purified by boiling the crude mass in water after which the naphthazarin intermediate alkali metal salt separates out as a crystalline product while the impurities remain colloidally suspended in the water from which the naphthazarin intermediate alkali metal salt is readily separated. While the alkali metal salt of the naphthazarin intermediate is only slightly soluble in the hot water it apparently has sufficient solubility to permit a transformation from a non-crystalline form to a definite crystalline form.

The following example is given to illustrate the invention. The parts used are by weight.

Example 50 parts of 1,5-dinitronaphthalene are introduced into 375 parts of sulfuric acid monohydrate with stirring. A solution of sulfur sesquioxide previously prepared by dissolving 20 parts of sulfur in fuming sulfuric acid containing 40% of $SO_3$ is slowly added over the course of from 1 to 2 hours under agitation and while maintaining a temperature of 10–15° C. When all the acid solution has been added, the reaction mixture is stirred for a short time and the temperature rises slowly to 25–30° C. The charge is then poured into ice and water and filtered to remove sulfur and other insoluble material. The filtrate is an intensely blue solution. To the filtrate cooled by the addition of ice, caustic soda solution is added until the whole becomes definitely alkaline. Precipitation of the sodium salt of naphthazarin intermediate commences before the product is alkaline and when the neutral or slightly alkaline stage is reached the precipitation is completed and the intense blue coloration of the solution disappears. The blue needles of the sodium salt of naphthazarin intermediate are filtered off and are washed with water.

The wet sodium salt cake of the crude naphthazarin intermediate as obtained above is suspended in 4,000 parts of warm water.

The temperature is then raised to 95–100° C. and held for 15 to 30 minutes. The suspension is then allowed to cool, and stand for 24 hours.

The supernatant liquor is decanted off, leaving the large crystals of purified sodium salt of the naphthazarin intermediate product which are then washed with water and isolated by filtration.

A yield of 20 to 25 parts of purified product is obtained. The isolated product may be dried at 100° C. It consists of bronzy needles most of which are of macroscopic size, being about ⅛ inch long, sometimes larger or smaller. The product may be converted to the free base by warming with glacial acetic acid, from which blue needles having a green reflex may be isolated on cooling. Both the sodium salt and the free base are poorly soluble in water or acetic acid.

It is essential that the wet cake of crude naphthazarin intermediate product be used for this operation for the dried crude does not disperse readily so that it is difficult to free the impurities from the crude cake, or effect the necessary solution of the naphthazarin intermediate alkali metal salt to permit the recrystallization in the manner desired.

The crystallization of the naphthazarin intermediate alkali metal salt takes place most readily at temperatures of from 90° to the boiling point of the mass. Lower temperatures do not give the same degree of separation of the naphthazarin intermediate alkali metal salt from the impurities. Where it is found necessary to remove the small amount of impurities which remain with the mother liquor in the naphthazarin intermediate alkali metal salt filter cake the mass may again be subjected to the treatment with the hot water.

The amount of water used may vary within wide limits for the naphthazarin intermediate (alkali metal salt) is practically insoluble in cold water. Satisfactory results have been obtained when this reaction has been carried out with variations of from 50 to 200 parts of water per part of naphthazarin intermediate alkali metal salt obtained.

The time of heating of the crude naphthazarin intermediate alkali metal salt in the water may also be varied within wide limits, although from 15 to 30 minutes will be sufficient to effect complete separation.

By this method a good yield of very pure naphthazarin intermediate alkali metal salt is obtained and the use of boiling glacial acetic acid is avoided.

I claim:

1. In the process for preparing naphthazarin intermediate from 1,5-dinitronaphthalene in acid solution, the steps which comprise precipitating the naphthazarin intermediate as the alkali metal salt by rendering the dilute acid solution of the naphthazarin intermediate slightly alkaline with an alkali metal compound while the mass so long as it is acid is maintained sufficiently cool to prevent conversion of the naphthazarin intermediate to napthazarin, filtering off the naphthazarin intermediate alkali metal salt thus precipitated and purifying the same by suspending the crude naphthazarin intermediate alkali metal salt in the form of the filter cake and without drying in water, heating at from 90 to 100° C. to permit the naphthazarin intermediate alkali metal salt to recrystallize, allowing the recrystallized naphthazarin intermediate alkali metal salt to settle while the impurities remain in suspension, cooling to permit any of the dissolved naphthazarin intermediate alkali metal salt to crystallize out, and separating the substantially pure naphthazarin intermediate alkali metal salt from the suspended impurities.

2. In the process for preparing naphthazarin intermediate from 1,5-dinitronaphthalene in acid solution, the steps which comprise precipitating the naphthazarin intermediate as the sodium salt by rendering the dilute acid solution of the naphthazarin intermediate alkaline with sodium hydroxide while the mass so long as it is acid is maintained sufficiently cool to prevent conversion of the naphthazarin intermediate to naphthazarin, filtering off the naphthazarin intermediate sodium salt thus precipitated, and purifying the same by suspending the crude naphthazarin intermediate sodium salt in the form of the filter cake and without drying in water, heating at from 90 to 100° C. to permit the naphthazarin intermediate sodium salt to recrystallize, allowing the recrystallized naphthazarin intermediate sodium salt to settle while the impurities remain in suspension, cooling to permit any of the dissolved naphthazarin intermediate sodium salt to crystallize out, and separating the substantially pure naphthazarin intermediate sodium salt from the suspended impurities.

3. In the process for preparing naphthazarin intermediate in which it is obtained from the reduction mass in the form of the alkali metal salt, the steps which comprise heating the crude naphthazarin intermediate alkali metal salt in the form of the moist filter cake obtained from the reduction mass without drying in water at from 90 to 100° C. to permit the naphthazarin intermediate alkali metal salt to recrystallize, allowing the recrystallized naphthazarin intermediate alkali metal salt to settle while the impurities remain in suspension, and separating the substantially pure naphthazarin intermediate alkali metal salt from the suspended impurities.

DAVID X. KLEIN.